United States Patent
Dahlin

[15] 3,650,891
[45] Mar. 21, 1972

[54] SYSTEM FOR MAINTAINING CONSTANT THE DRY MATERIAL FLOW TO A SHEET MATERIAL MANUFACTURING MACHINE

[72] Inventor: Erik B. Dahlin, Saratoga, Calif.
[73] Assignee: Measurex Corporation, Santa Clara, Calif.
[22] Filed: Apr. 7, 1969
[21] Appl. No.: 814,100

[52] U.S. Cl..............................162/259, 162/263, 162/380, 235/151.1, 235/151.34, 235/151.35
[51] Int. Cl.........................................................D21f 1/06
[58] Field of Search..................162/258, 259, 380, 252, 263; 137/2, 467.5; 235/151.3, 151.34, 151.35, 151.1, 151.12

[56] References Cited

UNITED STATES PATENTS

| 1,123,124 | 11/1914 | Harcourt | 137/467.5 |
| 2,379,746 | 7/1945 | Poirier | 137/467.5 |
| 3,129,323 | 4/1964 | Stout et al. | 235/151.12 X |
| 3,490,689 | 1/1970 | Hart et al. | 162/252 X |

OTHER PUBLICATIONS

Perry's Chemical Engineer's Handbook pp. 22: 51–56 & 63–64
Amber et al., Automatic Control, May 1958 pp. 43, 45–47
Morley et al., IEEE Convention Record 1965 03 pp. 90–94 & 98–100

Primary Examiner—S. Leon Bashore
Assistant Examiner—Thomas G. Scavone
Attorney—Flehr, Hohbach, Test, Albritton & Herbert

[57] ABSTRACT

The stockline valve of a paper making machine is regulated by comparing by means of a digital computer successive readings of the consistency of the paper pulp carried by a water carrier. Any resultant difference between such readings is converted to analog information and coupled to the set point of an analog flow control unit which is responsive to the actual flow rate to control the stock valve. The digital computer will perform changes of the flow controller set point in such a manner that the product of consistency and flow set point is constant. This provides control of the pulp flow in the line.

5 Claims, 1 Drawing Figure

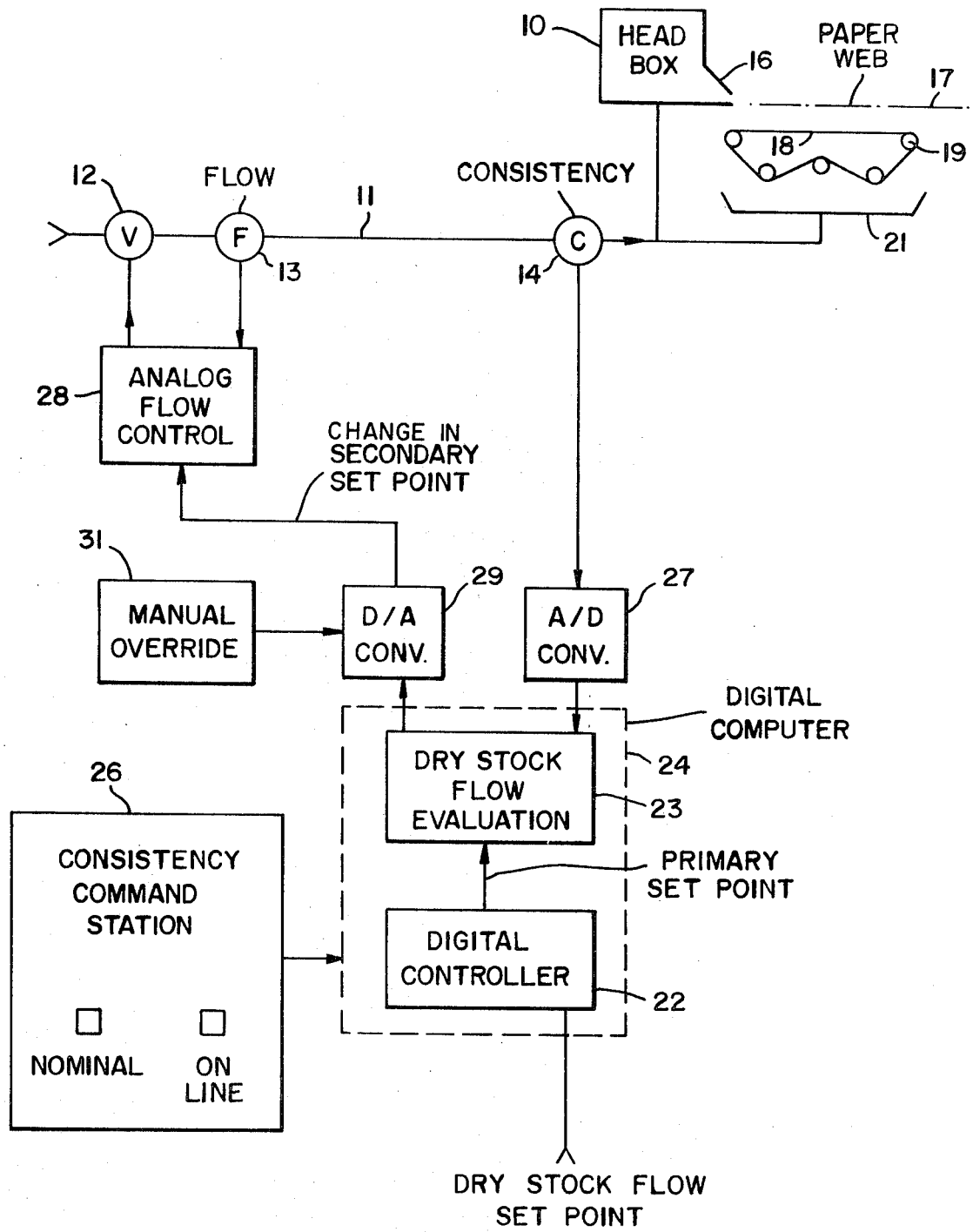

SYSTEM FOR MAINTAINING CONSTANT THE DRY MATERIAL FLOW TO A SHEET MATERIAL MANUFACTURING MACHINE

BACKGROUND OF THE INVENTION

The present invention is directed to a system for maintaining constant the dry material flow to a sheet material manufacturing machine and more particularly to a system where the sheet material is paper.

In a paper making process it is desirable to maintain the paper pulp flow in the stockline to the headbox constant. Variations can occur either in the flow rate, expressed as volume per unit time of the liquid carrying the paper fiber, or in consistency which is the amount or volume of pulp or paper fiber carried by a unit volume of water. The product of flow rate and consistency is, of course, the actual pulp or dry material flow which it is desired to maintain constant.

In the past, flow rate and consistency have been measured by two separate metering devices and the flow rate adjusted, either manually or by computer, to compensate for minor variations in consistency. Where a computer of the digital type was used it was necessary to store both flow rate and consistency information, compare the product to a reference standard and thereafter make the proper control adjustment in the flow rate. The flow rate is normally the only variable controlled for small changes in consistency. An increase in flow rate, for example, provides more paper fiber thus compensating for a lower consistency and vice versa.

While the foregoing computer control is adequate, it requires a relatively large amount of computer storage and time, increasing computer costs, and is not readily adaptable to optional manual override. This may be necessary if one of the metering units malfunctions.

OBJECTS AND SUMMARY OF THE INVENTION

It is, therefore, a general object of the invention to provide an improved system for maintaining constant the dry material flow in a process for manufacturing sheet material.

It is another object of the invention to provide a system as above which is automated but requires a minimum of computer storage and time and is readily adaptable to manual override.

In accordance with the above objects there is provided a system for maintaining constant the dry material flow to a machine for manufacturing sheet material where the dry material flow is the product of the flow rate of the material suspended in a liquid carrier being supplied to the machine and the consistency of the material relative to the liquid carrier, but where only said flow rate is controlled. The system includes means for measuring the consistency and digital means for comparing the difference between successive measurements of consistency. Means are provided for measuring the flow rate and for controlling the flow rate. Analog control means are responsive to the changes in consistency and the measured flow rate to adjust the flow rate in inverse proportion to the consistency change whereby the dry material flow is maintained constant.

BRIEF DESCRIPTION OF THE DRAWING

The single FIGURE is a block diagram showing a system embodying the present invention in conjunction with a partial schematic representation of a machine for manufacturing sheet material.

DETAILED DESCRIPTION OF THE PREFERRED EMBODIMENT

As illustrated in the drawing, the present invention is directed to a system for controlling the dry stock flow being fed to the headbox 10 of a paper making machine. However, it is applicable to other similar types of sheet material manufacturing machines. The dry stock material composed of paper pulp is carried by water in stockline 11 through a control valve 12. The paper pulp in stockline 11 is metered by both a flow meter 13 which measures volume per unit time and a consistency meter 14 which measures volume or weight of the paper pulp or stock material per unit weight of the carrier such as water.

Headbox 10 includes a slicer unit 16 which produces paper web 17. This is the initial formation of the final paper or sheet material output of the paper making machine. Web 17 is formed on a wire mesh 18 mounted on rollers 19. Excess paper pulp is captured by trough 21 and recirculated into headbox 10. The remainder of the paper making machine is not shown but includes suitable transport means, rollers and a steam system.

In addition, the paper making machine includes measuring instruments (not shown) for measuring both the moisture content of the paper being produced and its basis weight which is the weight per unit area. Such measuring devices are disclosed in copending applications entitled "Apparatus for Measuring the Amount of a Substance That Is Associated With a Base Material" in the names of Hill et al., Ser. No. 799,784, filed Feb. 17, 1969 and "Basis Weight Gauging Apparatus, System and Method" in the names of Bossen et al., Ser. No. 791,972, filed Jan. 17, 1969, and now abandoned.

As described in the above copending applications, basis weight measurements are coupled to a digital controller 22 which automatically adjusts the dry stock flow set point. In response to desired basis weight values, the digital controller determines what desired rate of dry material should be supplied to headbox 10. In the case of a paper making machine this would be the amount of dry paper pulp or stock which it is desired to be supplied to headbox 10 for any unit increment of time. This information designated "primary set point" is coupled to the dry stock or material flow evaluation unit 23.

Both digital controller 22 and dry stock flow evaluation unit 23 are part of a digital computer unit 24 which serves the overall purposes of the paper making machine control system. Also coupled to digital computer 24 is a consistency command station 26 which has two push buttons designated "nominal" and "on line." The on line push button completes the communication link between consistency meter 14 and the dry stock flow evaluation unit 23 through analog to digital converter 27 to form a control loop which will be discussed in detail below. The nominal push button is depressed in the event of a failure or malfunction of consistency meter 14. This removes the consistency meter from the control loop and in its place a nominal consistency value is stored in the dry stock flow evaluation unit 23. This allows the control system to remain operative even if the consistency meter 14 fails.

The digital computer means 24 which includes dry stock evaluation unit 23 compares successive measurements of consistency from meter 14 and produces an error signal proportional to the change of consistency. This error signal is coupled to an analog flow control unit 28 through a digital to analog converter 29. Such error signal is designated "change in secondary set point." Analog flow control unit 29 is coupled to flow meter 13 and adjusts the stock valve 12 in response to any error signal. This adjustment is, of course, inversely proportional to the change of consistency in order to maintain dry stock flow constant.

In operation, computer 24 reads the signal from consistency meter 14 repetitively. For example, readings may be made every two seconds and an average based on four samples is suitable for the system. This average can be achieved, for example, by filtering the four samples by means of a filtering algorithm to eliminate high frequency noise. Dry stock flow evaluation unit 23 calculates a change in the secondary set point by $$\Delta SSP = -PSP \times \Delta C \times \text{Constant 1}.$$

where "$\Delta SSP$" is the change of the secondary set point, "PSP" the primary set point which is the desired dry stock or paper pulp flow in stockline 11, $\Delta C$ is the change in the reading of the consistency from a previous control cycle and the "constant" is for purposes of conversion of units.

It is apparent from the above equation that during the start of the system the secondary set point is zeroed in or offset by use of analog flow control unit 28 so that in effect a zero error signal will be produced by dry stock flow evaluation unit 23 when the system is working at the desired values of consistency and flow rate. Thus, in accordance with the equation, when a change occurs in the consistency or density of the paper pulp and its liquid water carrier, the flow rate can then be adjusted to compensate accordingly by, for example, increasing the flow which provides the flow of more paper pulp or vice versa.

A manual override unit 31 coupled to digital to analog converter 29 allows easy manual operator control of the flow rate by use of the analog flow control unit 28. The manual override 31 is completely independent of the digital computer system 24 and thus permits operation without a digital computer.

The system of the present invention by use of an analog control loop including analog flow control unit 28, flow meter 13 and stock valve 12 eliminates a large load on computer 24 which would normally be the case if all of the functions of the flow control unit were to be digitally controlled. This is especially true in view of the large number of readings which must be taken. In addition, since digital controller 22 performs many other functions in the paper making system the present invention reduces problems of time sharing computer logic. Lastly, analog control unit 28 is readily adaptable to manual control which is frequently necessary in a system of the present type.

What is claimed is:

1. A system for maintaining constant the dry material flow to a machine for manufacturing sheet material where said dry material flow is the product of the flow rate of the material suspended in a liquid carrier being supplied the machine and the consistency of the material relative to the liquid carrier but where only said flow rate is controlled, the system comprising means for measuring said consistency, digital means for comparing successive readings of said measured consistency and producing an error signal proportional to any lack of comparison, means for measuring said flow rate, means for controlling said flow rate, and analog control means, responsive to said error signal and said measured flow rate for adjusting said flow rate in proportion to said error signal whereby said dry material flow is maintained constant.

2. A system as in claim 1 together with means for manually overriding said error signal whereby said analog control means may be manually controlled.

3. A system as in claim 1 together with analog to digital converter means for coupling said consistency measuring means to said digital means and digital to analog converting means for coupling said error signal from said digital means to said analog control means.

4. A system as in claim 1 together with means for setting said measured consistency to a nominal value whereby said system is immunized against a malfunction in said consistency measuring means.

5. A system as in claim 1 in which said digital means causes said error signal to very in inverse proportion to said change in consistency in accordance with the equation $$\Delta SSP = -PSP \times \Delta C \times \text{constant}$$

where $\Delta SSP$ is said variation of error signal, $PSP$ is a primary set point which is an independent variable indicative of desired dry material flow and $\Delta C$ is change in consistency, whereby said flow rate is adjusted in inverse proportion to said change in consistency.

* * * * *